(12) United States Patent
Muraishi

(10) Patent No.: US 10,922,035 B2
(45) Date of Patent: Feb. 16, 2021

(54) IMAGE FORMING DEVICE AND NON-TRANSITORY COMPUTER READABLE MEDIUM FOR CHECKING PROCESSING RESULT AND REGISTERING PROCESSING EXECUTION DATA

(71) Applicant: FUJI XEROX CO., LTD., Tokyo (JP)

(72) Inventor: Rie Muraishi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 166 days.

(21) Appl. No.: 16/013,428

(22) Filed: Jun. 20, 2018

(65) Prior Publication Data

US 2019/0012124 A1 Jan. 10, 2019

(30) Foreign Application Priority Data

Jul. 4, 2017 (JP) .................................. 2017-131238

(51) Int. Cl.
*G06F 3/12* (2006.01)
*H04N 1/00* (2006.01)
(52) U.S. Cl.
CPC .......... *G06F 3/1256* (2013.01); *G06F 3/1204* (2013.01); *G06F 3/1205* (2013.01); *H04N 1/00031* (2013.01); *H04N 1/00042* (2013.01)

(58) Field of Classification Search
CPC .... G06F 3/1256; G06F 3/1204; G06F 3/1203; G06F 3/1205; G06F 3/1258; H04N 1/00042; H04N 1/00031
See application file for complete search history.

(56) References Cited

U.S. PATENT DOCUMENTS

| 2010/0157362 A1* | 6/2010 | Oomura | G06F 3/1204 358/1.15 |
| 2014/0280795 A1* | 9/2014 | Mori | G06F 3/1239 709/220 |
| 2015/0029552 A1* | 1/2015 | Nishizawa | G06F 3/1203 358/1.15 |

FOREIGN PATENT DOCUMENTS

JP 2015-194941 A 11/2015

* cited by examiner

*Primary Examiner* — Juan M Guillermety
(74) *Attorney, Agent, or Firm* — Oliff PLC

(57) ABSTRACT

An image forming device includes a checking unit and a registering unit. When processing execution data to be executed with a preset setting is selected, the checking unit checks whether a processing result is what a user has intended if the processing execution data has not been created in the image forming device and if the preset setting has not yet been checked. The registering unit registers the processing execution data as checked data if the checking unit has checked that the processing result is what the user has intended.

14 Claims, 29 Drawing Sheets

| | |
|---|---|
| Double-sided/single-sided | Single-sided |
| Color mode | Color |
| N-up printing | 2-up |
| Document size | A4 |
| Stapling | No |
| Output sheet size | The same as the document size |
| Sheet tray setting | Tray 2 |
| Edge deleting | No |
| Punching | Yes |
| Tilt compensation | No |
| Folding | No |

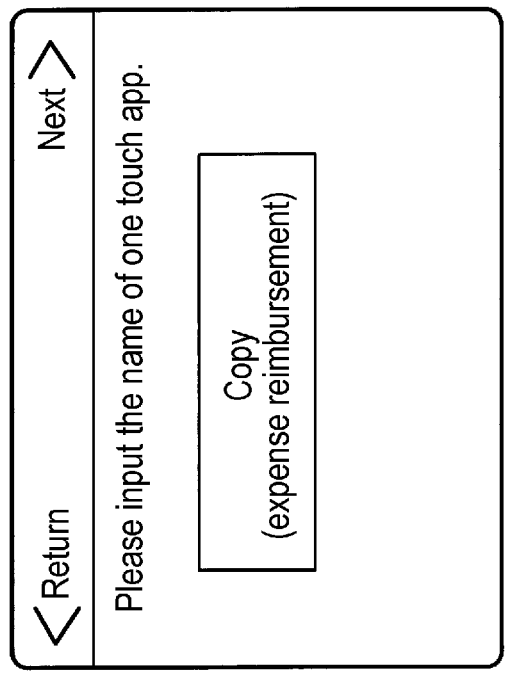
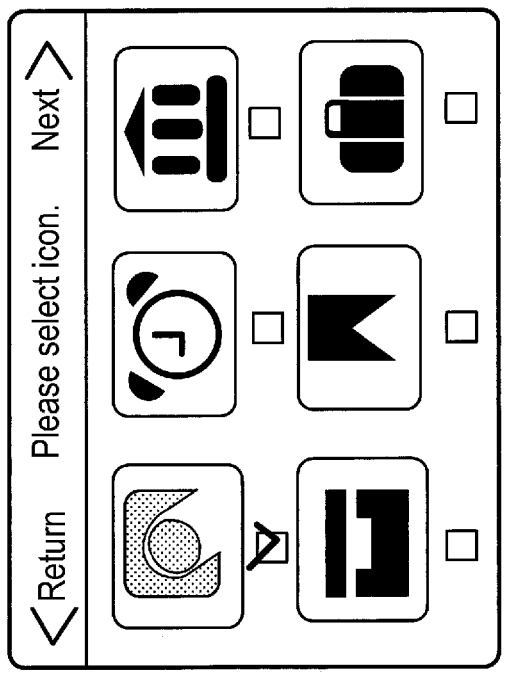
FIG. 13B
FIG. 13A

FIG. 19

The following one touch apps include setting items that are not executable.

☑ XX (meeting material output)

☑ Scan (for the general affairs department)

| Delete all | Change all | Inform all | Checked |

Copy (expense reimbursement)

This app will be executed for the first time in this device.
Please select a checking approach for parameters.

Check without executing the job

Check by looking at a sample image

Execute the job without checking

40B

IMAGE FORMING DEVICE AND NON-TRANSITORY COMPUTER READABLE MEDIUM FOR CHECKING PROCESSING RESULT AND REGISTERING PROCESSING EXECUTION DATA

CROSS-REFERENCE TO RELATED APPLICATIONS

This application is based on and claims priority under 35 USC 119 from Japanese Patent Application No. 2017-131238 filed Jul. 4, 2017.

BACKGROUND

Technical Field

The present invention relates to an image forming device and a non-transitory computer readable medium.

SUMMARY

According to an aspect of the invention, there is provided an image forming device including a checking unit and a registering unit. When processing execution data to be executed with a preset setting is selected, the checking unit checks whether a processing result is what a user has intended if the processing execution data has not been created in the image forming device and if the preset setting has not yet been checked. The registering unit registers the processing execution data as checked data if the checking unit has checked that the processing result is what the user has intended.

BRIEF DESCRIPTION OF THE DRAWINGS

An exemplary embodiment of the present invention will be described in detail based on the following figures, wherein:

FIGS. 12 through 15 illustrate examples of display screens for explaining steps of creating a one touch app;

FIG. 19 illustrates an example of a list of inexecutable one touch apps displayed on an operation panel of the image forming device;

FIG. 24 illustrates an example of a selection screen for selecting an approach to checking settings of a one touch app;

DETAILED DESCRIPTION

An exemplary embodiment of the invention will be described below in detail with reference to the accompanying drawings.

Figure 1:
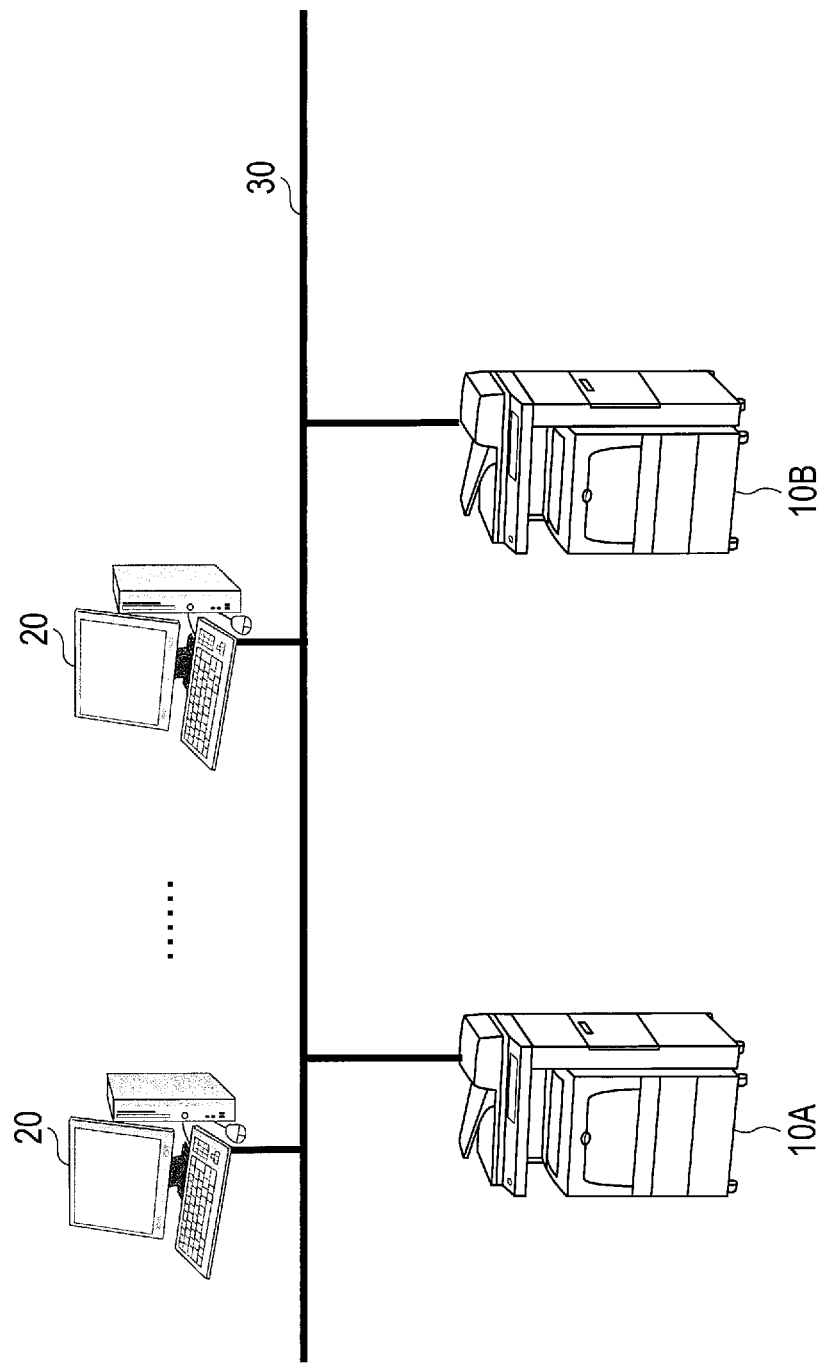
FIG. 1 illustrates an example of the configuration of an image forming system according to the exemplary embodiment.

FIG. 1 illustrates an example of the configuration of an image forming system according to the exemplary embodiment.

The image forming system shown in FIG. 1 includes two image forming devices 10A and 10B and plural terminal devices 20 connected to each other via a network 30. The terminal devices 20 each generate print data and send it to the image forming devices 10A and 10B via the network 30. The image forming devices 10A and 10B each receive the print data from the terminal devices 20 and output an image represented by the print data onto a sheet. The image forming devices 10A and 10B are multifunction devices having multiple functions, such as a print function, a scan function, a copy function, and a fax sending-and-receiving function.

Figure 2:
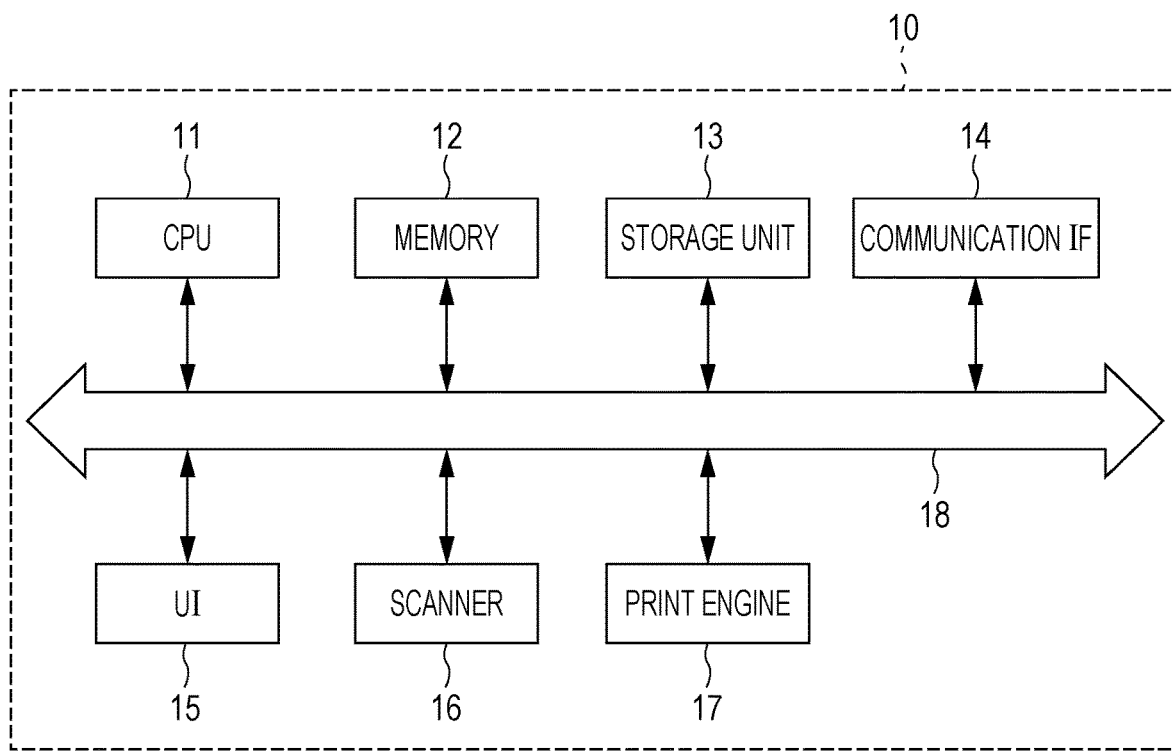
FIG. 2 is a block diagram illustrating an example of the hardware configuration of an image forming device according to the exemplary embodiment.

An example of the hardware configuration of each of the image forming devices 10A and 10B in the image forming system is shown in FIG. 2. The configurations of the image forming devices 10A and 10B are similar to each other. As far as the configurations of the image forming devices 10A and 10B are described, the image forming devices 10A and 10B will simply be called the image forming device 10.

As shown in FIG. 2, the image forming device 10 includes a central processing unit (CPU) 11, a memory 12, a storage unit 13, such as a hard disk drive (HDD), a communication interface (IF) 14 that sends and receives data to and from an external device via the network 30, a user interface (UI) 15 including a touchscreen or a liquid crystal display and a keyboard, a scanner 16, and a print engine 17. These elements are connected to one another via a control bus 18.

The print engine 17 prints an image on a recording medium, such as a print sheet, after process steps, such as charging, exposure, developing, transferring, and fixing.

The CPU 11 executes predetermined processing based on a control program stored in the memory 12 or the storage unit 13 so as to control the operation of the image forming device 10.

In this exemplary embodiment, the control program executed by the CPU 11 is stored in the memory 12 or the storage unit 13. However, the control program may be stored in a storage medium, such as a compact disc-read only memory (CD-ROM), and be provided to the CPU 11.

Figure 3:
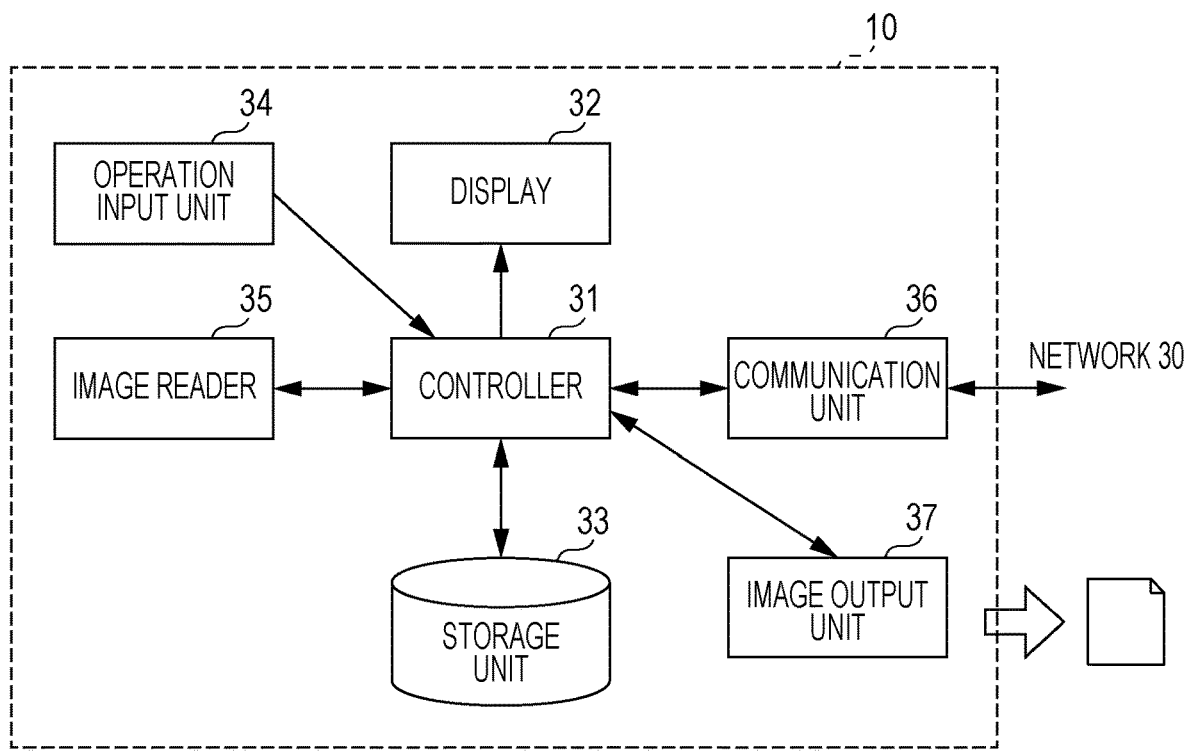
FIG. 3 is a block diagram illustrating an example of the functional configuration of the image forming device.

FIG. 3 is a block diagram illustrating an example of the functional configuration of the image forming device 10 implemented by executing the above-described control program.

As shown in FIG. 3, the image forming device 10 includes a controller 31, a display 32, a storage unit 33, an operation input unit 34, an image reader 35, a communication unit 36, and an image output unit 37.

The display 32 is constituted by an operation panel, such as a touchscreen, and receives an operation performed on the image forming device 10 and presents operation results, processing results, and so on, to a user.

The storage unit 33 is a memory for temporarily storing image data while the controller 31 is executing processing. The operation input unit 34 is used for receiving various operations performed by a user. The image reader 35 reads a document set in the image forming device 10 and converts an image of the document into image data.

The communication unit 36 receives data source from an external device, such as a terminal device 20. For example, the communication unit 36 receives a print job from the terminal device 20, sends image data by fax to the terminal device 20, and sends and receives emails to and from the terminal device 20.

In response to an instruction from the controller 31, the image output unit 37 prints image data on a recording medium, such as a print sheet, and outputs the printed recording medium.

The controller 31 controls the display 32, the storage unit 33, the operation input unit 34, the image reader 35, the communication unit 36, and the image output unit 37 so as to execute various operations, such as printing, copying, and reading of a document image.

The display 32 displays icons for selecting the execution of various functions on a screen. When one of the icons displayed on the screen of the display 32 is selected by a user, the controller 31 performs control so that the function corresponding to the selected icon will be executed.

The icon is a design pattern displayed on an operation screen and used for starting a specific application program (hereinafter called "an app") or indicating an operation position for shifting to a specific screen. This design pattern includes a pictorial design and may also include various characters, such as alphabets, Hiragana (Japanese syllabary), Katakana (another Japanese syllabary), and Chinese characters.

Icons displayed on the screen of the display 32 include basic icons and related icons. A basic icon is an icon used for starting a program or an app for executing a basic function of the image forming device 10, such as copying, scanning, fax sending, device setting, and authentication setting. A related icon is an icon generated by a user in relation to a basic icon.

One of the related icons is an icon called a one touch app icon. The one touch app icon is an icon for executing an application program called a one touch app (processing execution data).

The one touch app is an application program for executing processing, assuming that various instructions have been received at one time as a result of a user selecting a corresponding icon. Examples of the various instructions are: (1) operation such as copying, scanning, and fax sending; (2) various settings, such as the number of copies, single-sided/double-sided, color/monochrome, data storage location, and fax sending destination; and (3) a processing start instruction (start button).

The one touch app is processing execution data for executing specified processing when a corresponding icon is selected. When a one touch app is selected as a result of a user touching a corresponding one touch app icon, the controller 31 controls execution units, such as the storage unit 33, the image reader 35, the communication unit 36, and the image output unit 37, so that processing will be executed with settings set in the selected one touch app.

The image forming device 10 of this exemplary embodiment has the function called cloning. Cloning is the function of copying a one touch app created in one device into another device. For example, in the office where plural image forming devices 10 are used, a one touch app is created in one image forming device 10, and then, it is copied into the other image forming devices 10. This can eliminate the need for each image forming device 10 to create the same one touch app by following the same operation procedure.

If a new image forming device 10 is added in the office, a one touch app used in the other image forming devices 10 in the office may be copied into this new image forming device 10.

In the above-described situations, however, even if a one touch app created in an image forming device 10 is executed without any error in this image forming device 10, when it is copied into another image forming device 10, an error may occur when the one touch app is executed.

A one touch app is created in an image forming device 10 and is copied into another image forming device 10. In this case, if the states of the two image forming devices 10 are different, an error may occur when the copied one touch app is selected and executed, or the one touch app may not be executed at all.

For example, if a one touch app for performing operations including stapling is copied into another image forming device 10 which is not provided with a post-processor for performing stapling, stapling is not performed when the one touch app is executed. If a one touch app for performing operations including color printing is copied into another image forming device 10 which does not support color printing, an error occurs and color printing is not performed when the one touch app is executed. That is, processing results, such as output results, are not what a user has intended.

In the above-described examples, the occurrence of errors when copying a one touch app from an image forming device 10 into another image forming device 10 has been discussed in terms of different functions of the two image forming devices 10. However, errors may also occur even when the image forming devices 10 have the same functions.

For example, it is now assumed that a user of an image forming device 10 has found an output image is rather pale and has created a one touch app by adjusting the density to be darker. In this case, if this one touch app is copied into another image forming device 10, the output image in this image forming device 10 may be too dark. In another example, if one touch app is copied from an image forming device 10 into another image forming device 10, the color shade of an output image in this image forming device 10 may be different from that in the image forming device 10 having created the one touch app. In these examples, too, processing results, such as output results, are not what a user has intended.

"Output results are not what a user has intended" means that the actual output results are not what a user has expected. In this case, not only the results obtained in terms of the functions, but also the results in terms of other factors, such as the image quality, are not what a user has expected.

To address this issue, the image forming device 10 of this exemplary embodiment has the following configuration.

When a created one touch app is selected in an image forming device 10, if the selected one touch app has not been created in this image forming device 10 and if settings of this one touch app have not yet been checked, the controller 31 of this image forming device 10 checks whether processing results, such as printing results or reading results, are what a user has intended.

If the controller 31 has checked that the processing results are what the user has intended, it registers the one touch app as a checked one touch app.

When a one touch app is selected and executed for the first time after it has been copied into an image forming device 10 from another image forming device 10, if the one touch app has successfully been executed, the controller 31 determines that the processing results are what the user has intended.

If a one touch app to be checked concerns copying processing, the controller 31 performs test printing and checks whether the printing result is what the user has intended. If a one touch app to be checked concerns scanning (reading) processing, the controller 31 displays a read document image as a preview image and checks whether the display result is what the user has intended.

If a user has input information indicating that the user has checked the processing results, the controller 31 determines that the processing results are what the user has intended.

If a user has provided an instruction to execute a one touch app after test printing has been performed or a read image has been displayed as a preview image, the controller 31 determines that the processing results are what the user has intended.

When the controller 31 is checking whether processing results of a one touch app are what the user has intended, the operation input unit 34 receives a change made to a setting of this one touch app. The controller 31 then makes a change to the one touch app in accordance with the change made to the setting received by the operation input unit 34.

If a user made a change to a setting of a one touch app does not have authorization to make a change to the one touch app, the controller 31 temporarily receives a change made to the setting received by the operation input unit 34 and informs a preset address (the address of a user having authorization to make a change to the one touch app) that a change is required to be made to the setting.

If a user made a change to a setting of a one touch app does not have authorization to make a change to the one touch app, the controller 31 may generate a new one touch app in which a change made to the setting received by the operation input unit 34 is reflected.

This exemplary embodiment will discuss a one touch app for executing processing with preset settings when a corresponding icon on the display 32 is selected. However, an exemplary embodiment of the invention may be applied to any type of processing execution data that executes processing with preset settings when it is selected.

Operations executed by an image forming device 10 will be described below in detail with reference to the drawings.

In the following description, it is assumed that a one touch app is created by the image forming device 10A and is then copied into the image forming device 10B by cloning.

Figure 4:
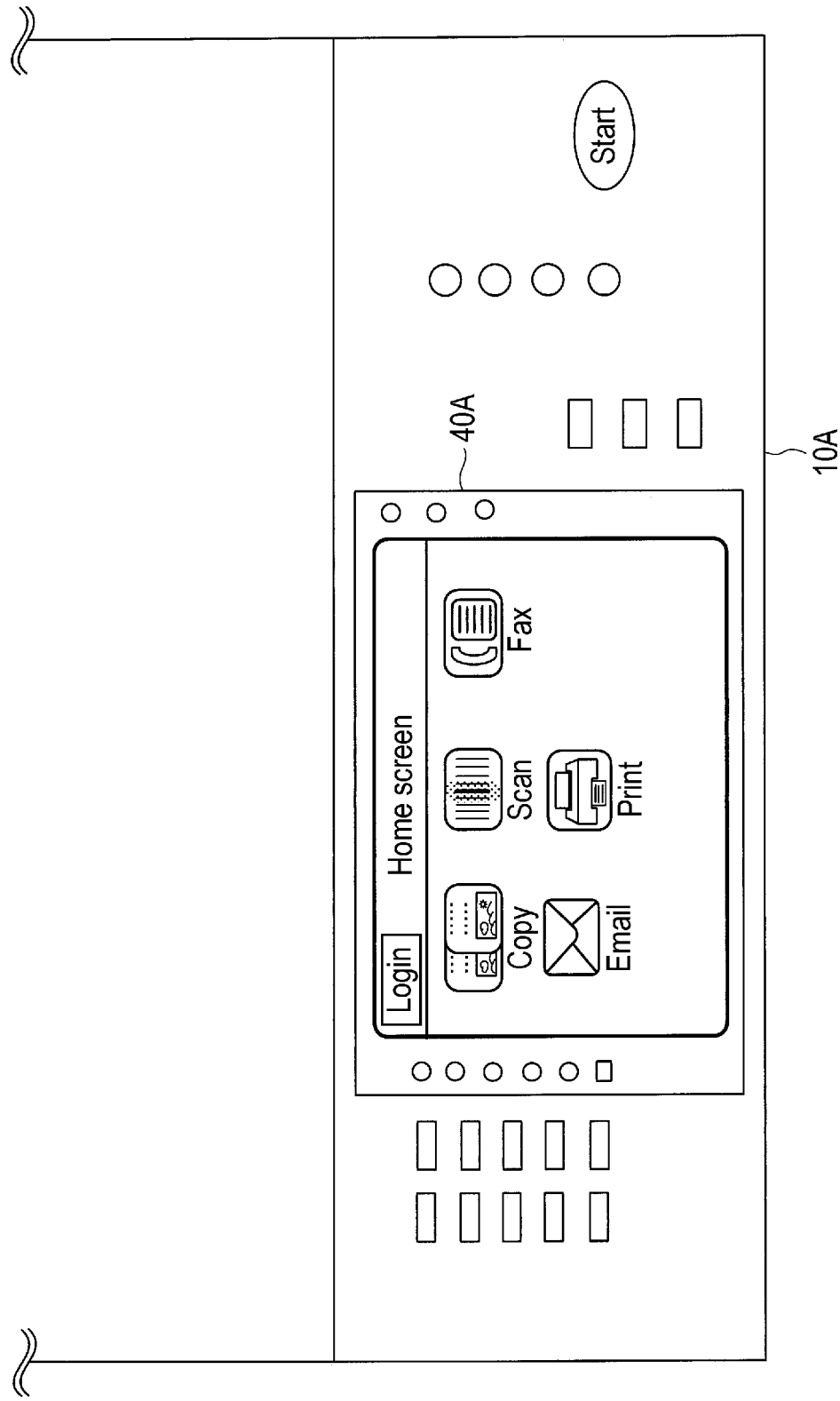
FIG. 4 illustrates an example of a display screen of an operation panel of the image forming device.

Creating of a one touch app in the image forming device 40A will first be discussed. An example of the display content of an operation panel 40A of the image forming device 10A is shown in FIG. 4. The operation panel 40A is a touchscreen, and serves both as the display 32 and the operation input unit 34.

Figure 5:
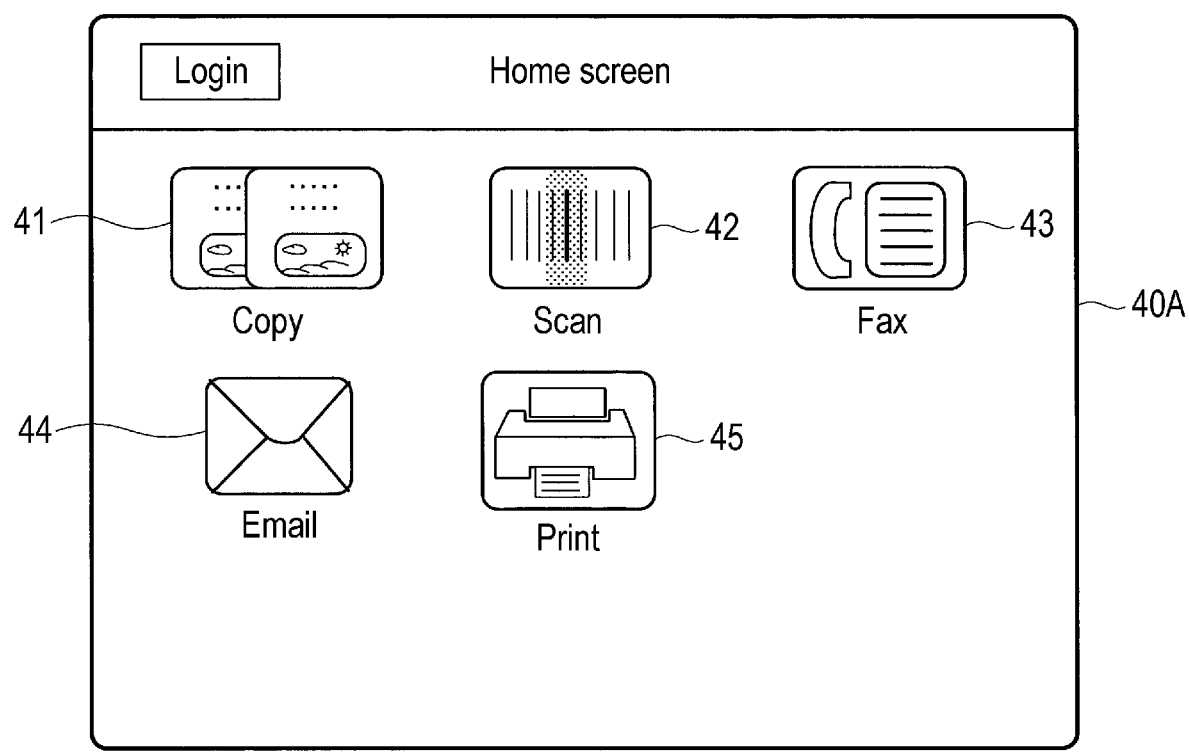
FIG. 5 is an enlarged view of the display content of a home screen when the image forming device is in a standby state.

In FIG. 4, a home screen when the image forming device 10A is in the standby state is displayed on the operation panel 40A. FIG. 5 is an enlarged view of the display content of this home screen.

In the example of the home screen shown in FIG. 5, plural icons 41 through 45 for executing certain functions are displayed on the operation screen of the operation panel 40A.

For example, the icon 41 is an icon for executing a copy function. As a result of a user touching the icon 41 with a finger, a copy application program is started so that the user can use the copy function.

The icon 42 is an icon for executing a scan function. The icon 43 is an icon for executing a fax function. The icon 44 is an icon for executing an email sending-and-receiving function. The icon 45 is an icon for executing a printer setting function.

The icons 41 through 45 shown in FIG. 5 are basic icons for executing basic functions of the image forming device 10A. The image forming device 10A can generate a one touch app for executing a function customized for a user, as well as basic apps represented by the icons 41 through 45.

Figure 6:
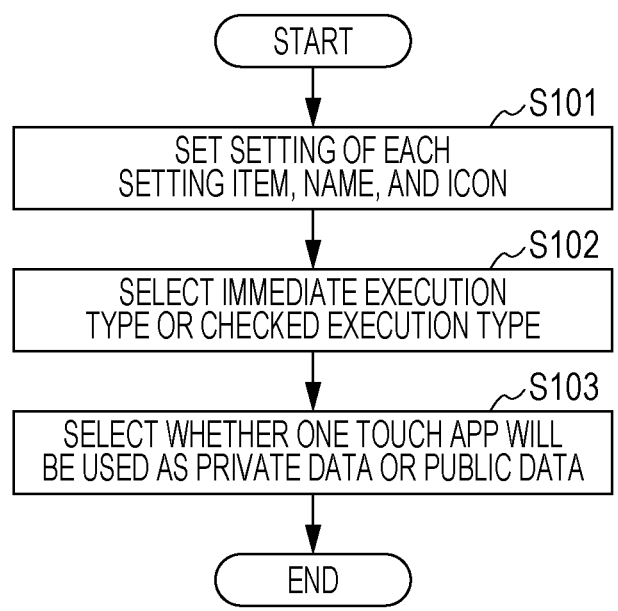
FIG. 6 is a flowchart illustrating an operation executed by the image forming device when registering (creating) a one touch app.

An operation executed by the image forming device 10A when registering (creating) a one touch app will be described below with reference to the flowchart of FIG. 6.

Figure 7:
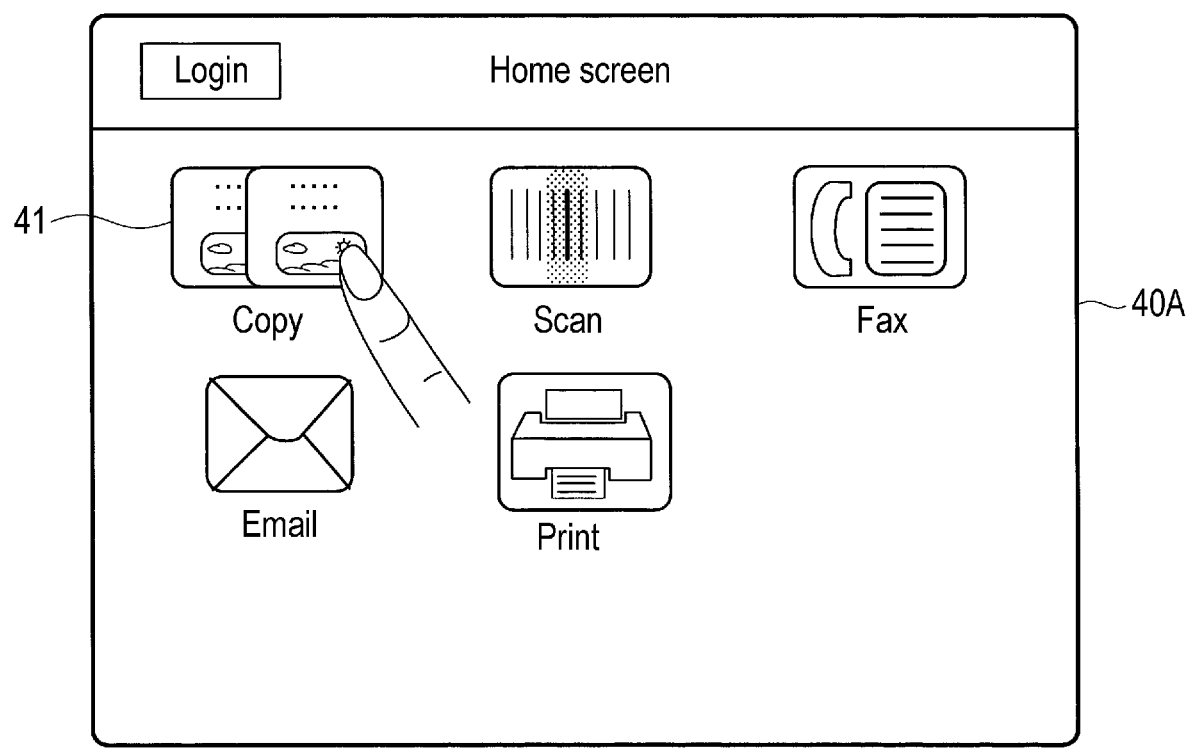
FIGS. 7 through 10 illustrate examples of display screens for explaining steps of creating a one touch app.

In step S101, a user selects an icon of a basic function, based on which the user wishes to create a one touch app, and sets settings of individual setting items and selects an icon and a name of the one touch app. It is assumed that the user has selected the icon 41 corresponding to the copy function, as shown in FIG. 7.

Figure 8:
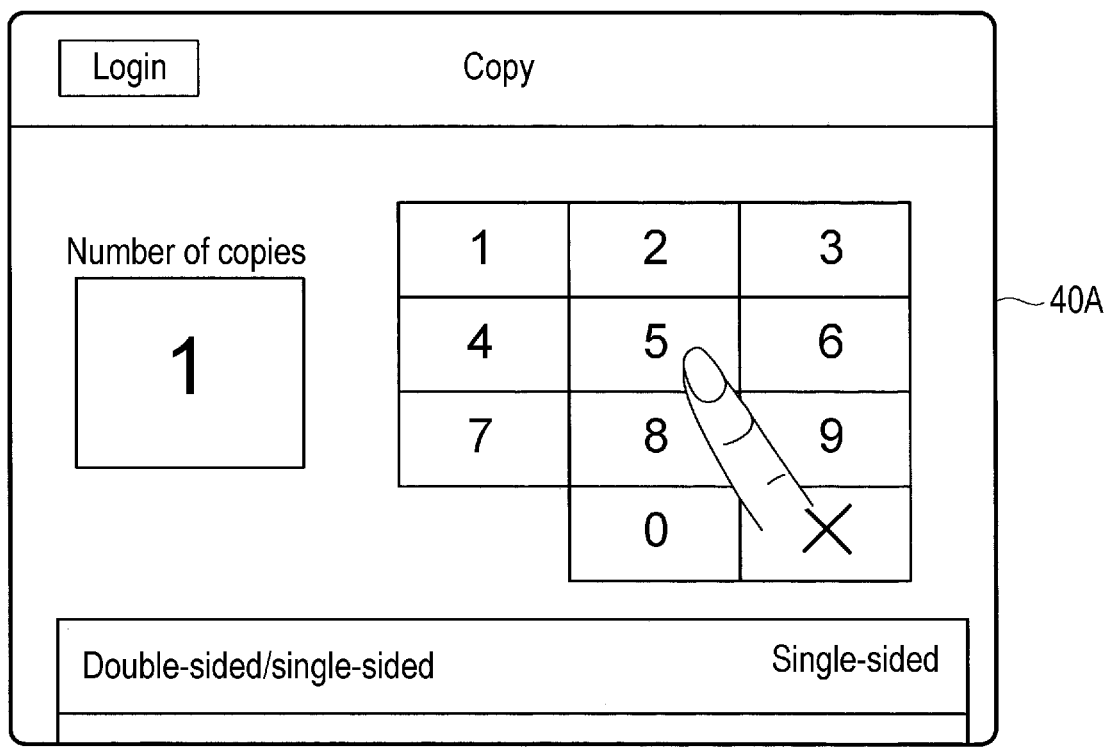
Figure 9:
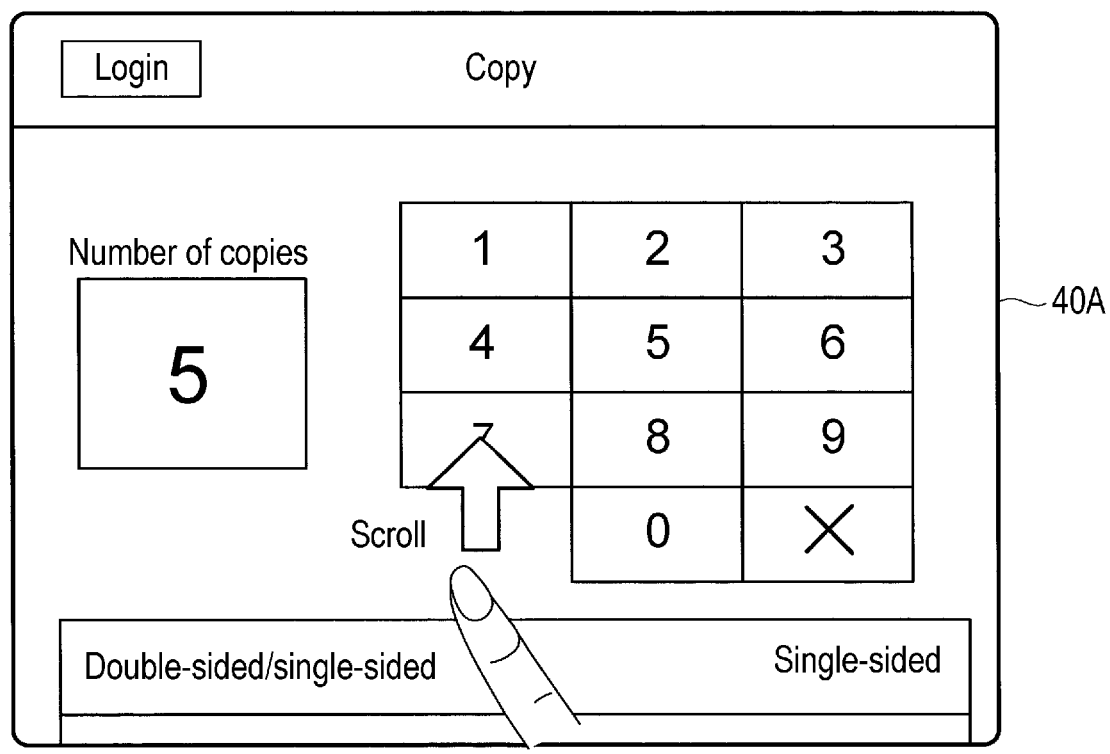

As a result of the user selecting the icon 41 corresponding to the copy function, a screen for inputting values and for setting settings of various setting items of the copy function, such as that shown in FIG. 8, is displayed. In FIG. 8, the user inputs "5" as the number of copies.

This operation screen includes display areas for inputting values and settings of various setting items other than this setting item (the number of copies). The user thus scrolls up on the display screen of the operation panel 40A with a finger so as to display the display area for another setting item downward.

Figure 10:
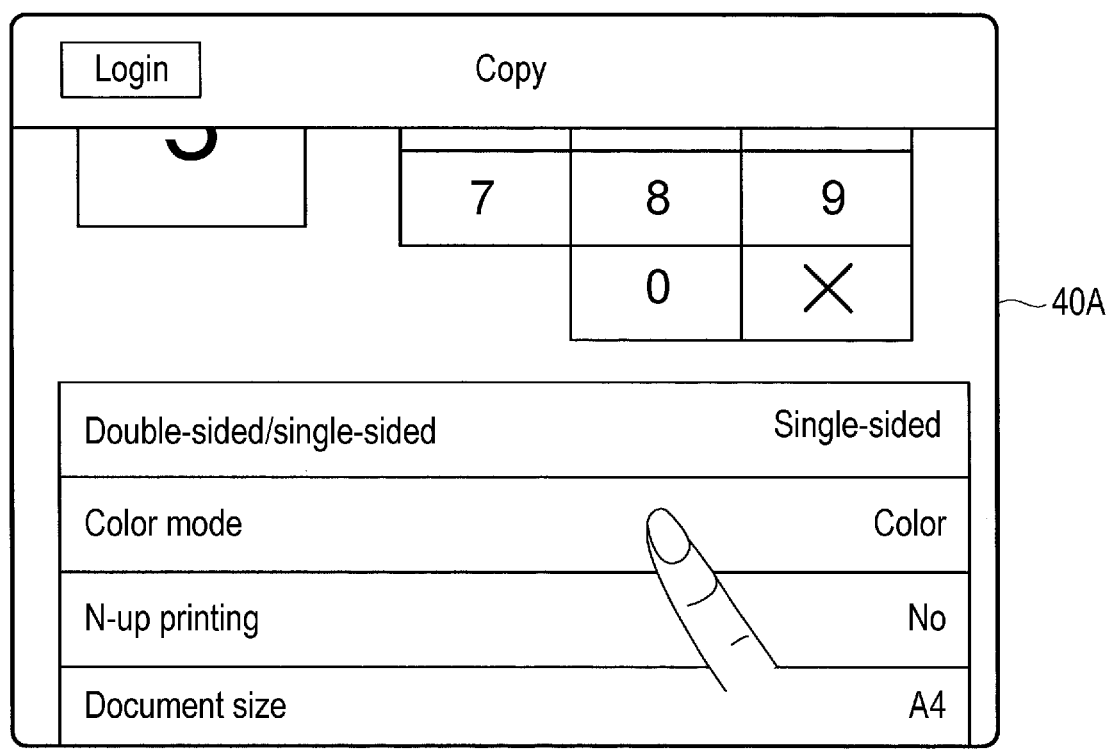
Figure 11:
FIG. 11 illustrates examples of settings registered as a one touch app.

Then, as shown in FIG. 10, the user selects setting items other than the number of copies so as to set values or settings to be registered in a one touch app. Examples of settings to be registered in a one touch app are shown in FIG. 11. FIG. 11 shows that "Single-sided" is selected as double-sided/single sided printing and "Color" is set as a color mode.

Figure 12:
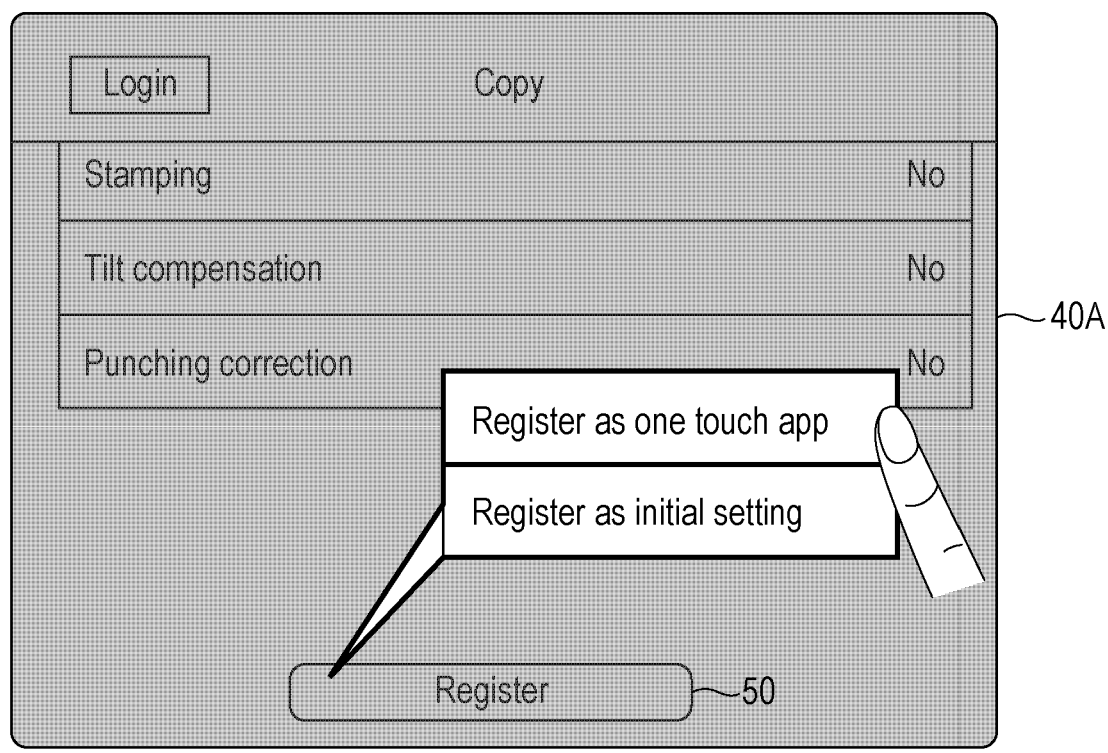

After setting various values and settings in this manner, when the user taps a register button 50 indicating "Register", as shown in FIG. 12, a popup screen for selecting the registration purpose of the set values and settings appears. In this case, the user intends to generate a one touch app, and thus selects an option "Register as one touch app".

Then, as shown in FIG. 13A, a selection screen for selecting the design of an icon is displayed on the operation panel 40A. On this selection screen, the user may select a design of a one touch app icon as the user wishes. After selecting the design of the one touch app icon, a screen for inputting the name of the one touch app is displayed on the operation panel 40A, as shown in FIG. 13B. In the example in FIG. 13B, the user has input "Copy (expense reimbursement)" as the name of the one touch app.

Figure 14:
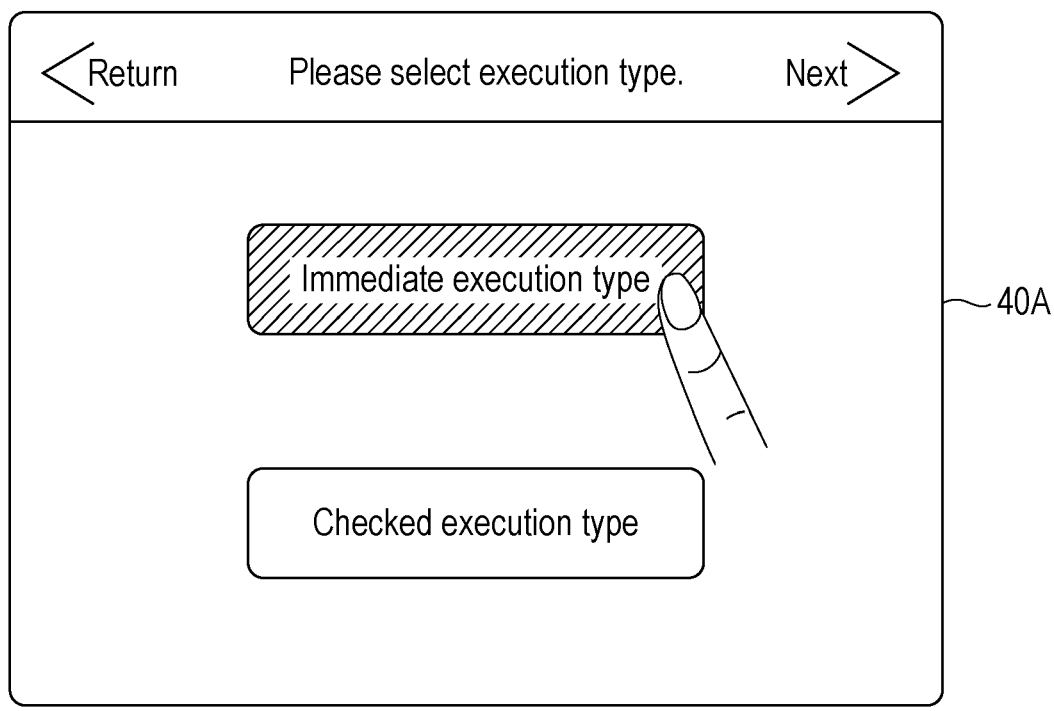

After selecting the design of the icon and the name of the one touch app, in step S102, the user selects the execution type of the one touch app, as shown in FIG. 14. As the execution type, the user selects an immediate execution type or a checked execution type. The immediate execution type is the following execution type. When a one touch app icon is selected, the associated one touch app is immediately started and executed. The checked execution type is the following execution type. When a one touch app icon is selected, the associated one touch app is not immediately started, but a check screen showing a list of set values and settings set as the individual setting items of this one touch app is displayed for the user having selected the one touch app icon. When the user has checked the set values and settings and has provided an instruction to start the one touch app, the one touch app is started. In the example in FIG. 14, the user has selected the immediate execution type.

Figure 15:
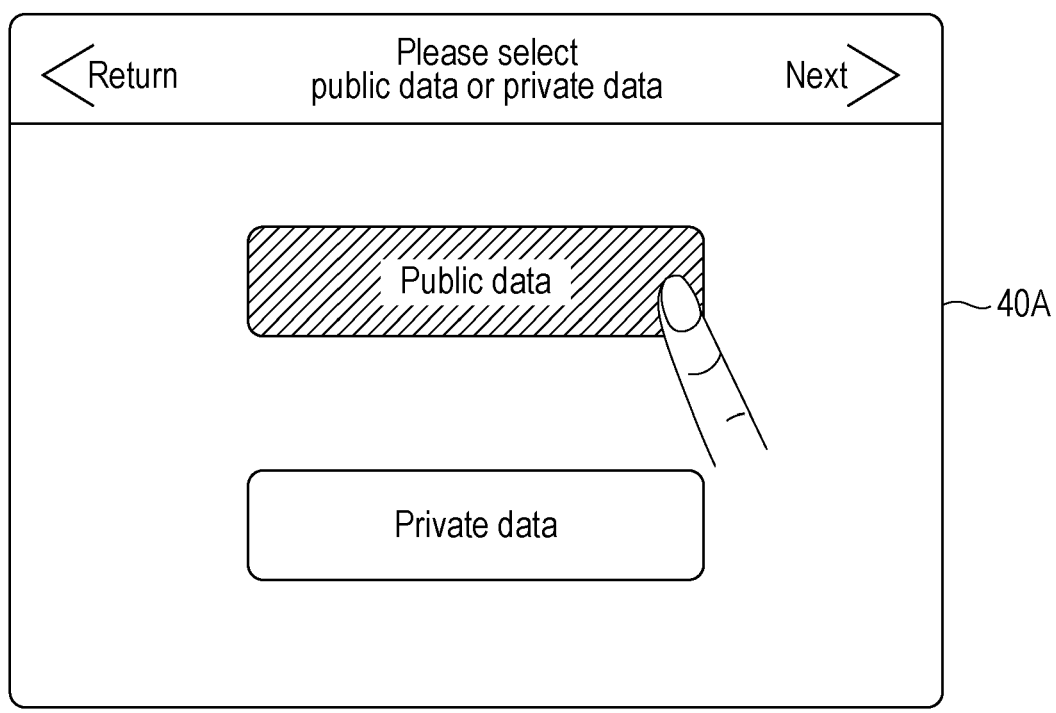

Then, in step S103, the screen shown in FIG. 15 is displayed, and the user selects whether the one touch app will be used as private data or public data.

The public data is data that can be used by all users and is typically generated by a machine administrator. Accordingly, the public data can be edited only by the machine administrator. General users do not have administrator authorization and can use the public data but do not have the right to edit it.

The private data is data that can be used and edited only by a creator user. Other users including the machine administrator have no right to use or edit the private data.

On the screen shown in FIG. 15, the user has selected that the one touch app will be used as public data.

Figure 16:
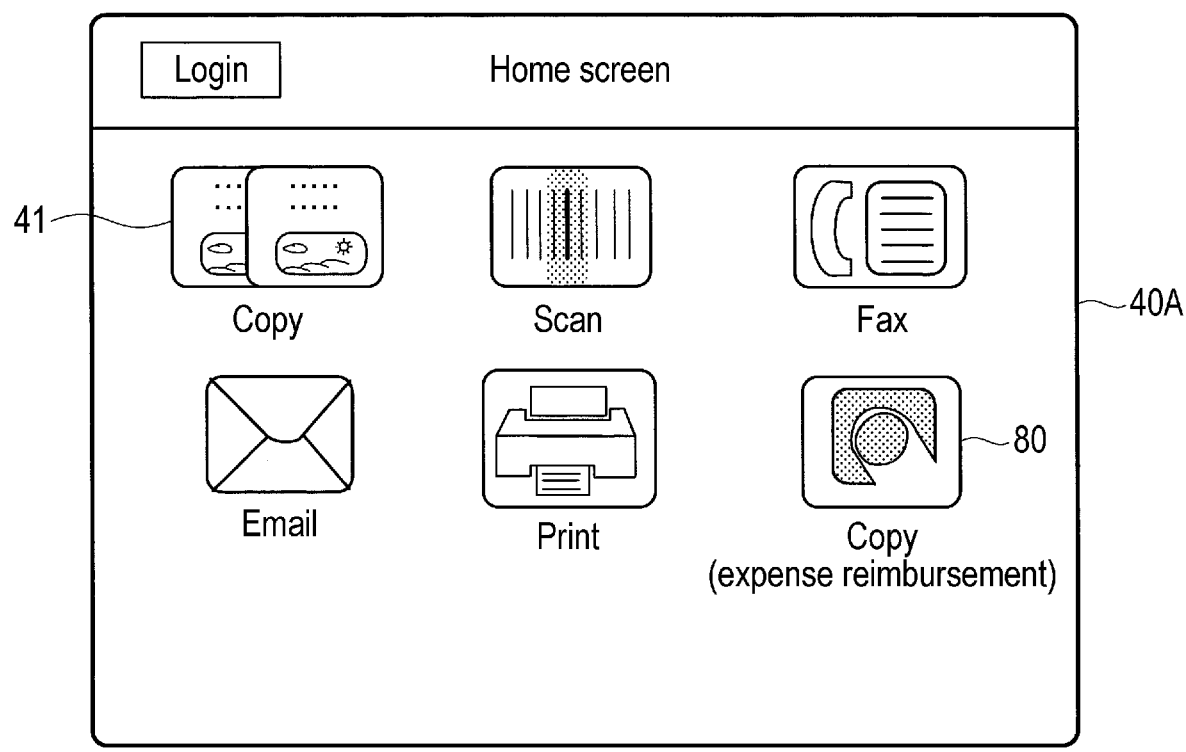
FIG. 16 illustrates an example a home screen after a one touch app has been created.

When a one touch app has been generated through the steps discussed with reference to FIGS. 7 through 15, a one touch app icon 80 corresponding to the generated one touch app is added on the operation screen of the operation panel 40A, as shown in FIG. 16.

As a result of the user selecting the one touch app icon 80, the copy function based on the settings and values set by the user is executed. In this manner, by registering frequently used settings and values as a one touch app, the user can execute processing with fewer operations.

Figure 17:
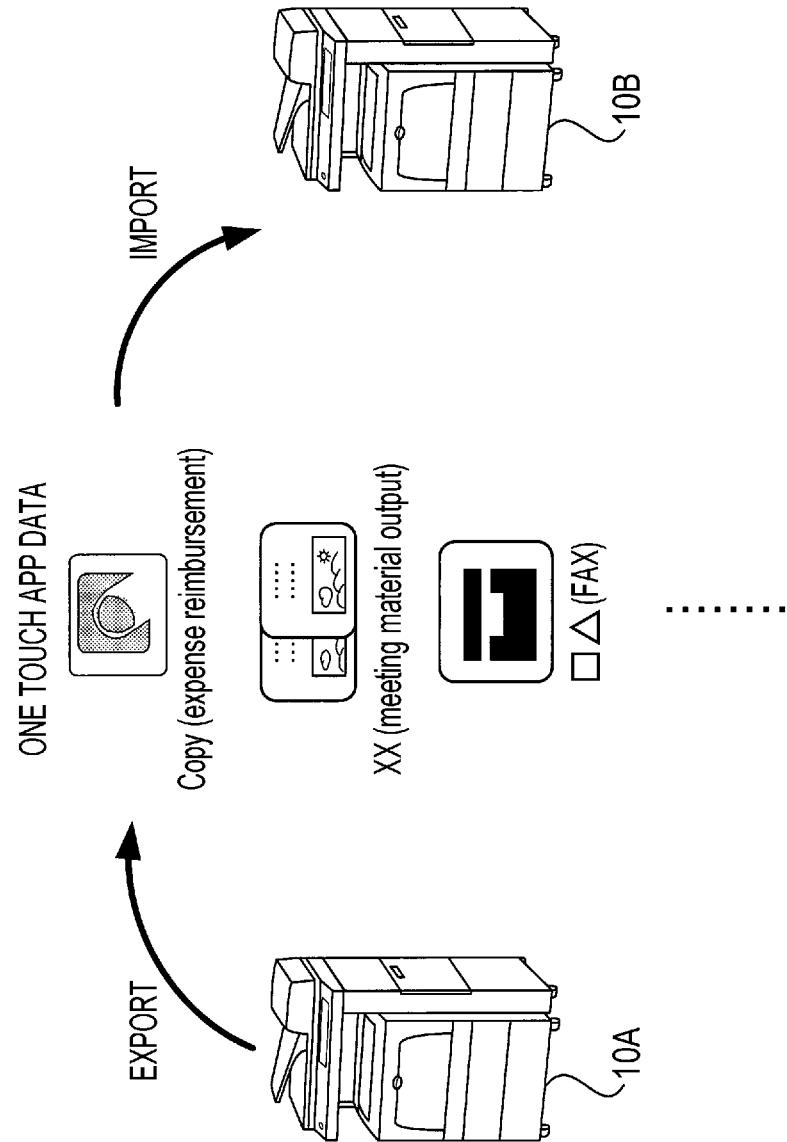
FIG. 17 illustrates that cloning is being performed for copying one touch app data generated in an image forming device into another image forming device.

FIG. 17 illustrates that cloning is being performed for copying one touch app data generated in the image forming device 10A into the image forming device 10B.

When cloning is performed for copying one touch apps from the image forming device 10A into the image forming device 10B, the image forming device 10A exports one touch app data and the image forming device 10B imports it. Executing such cloning processing makes it possible to copy all the one touch apps created in the image forming device 10A into the image forming device 10B at one time.

Figure 18:
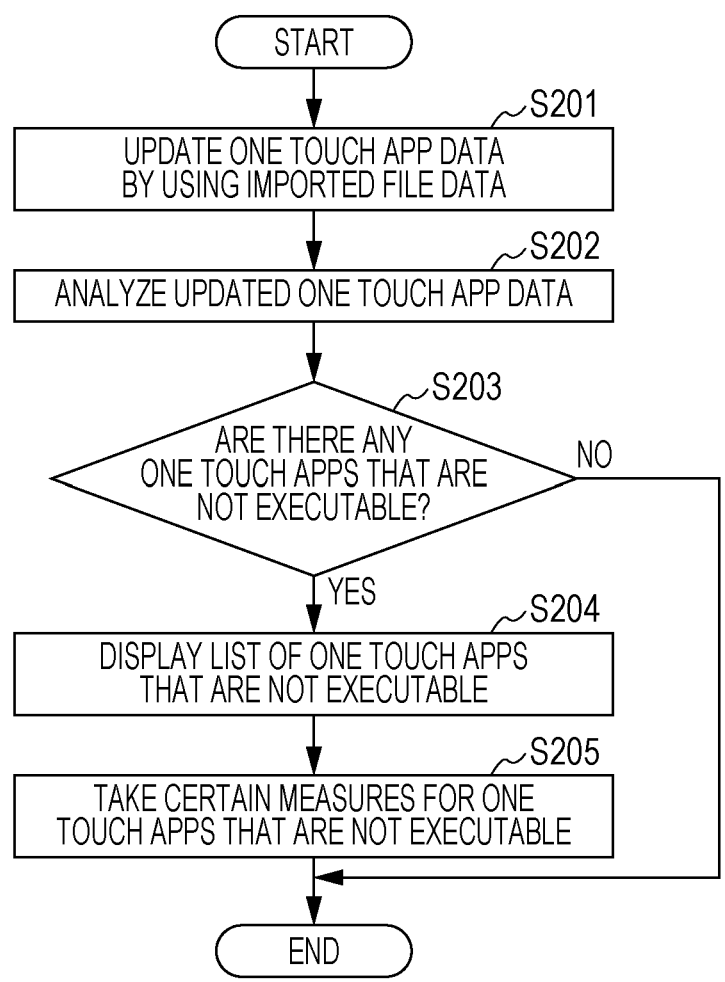
FIG. 18 is a flowchart illustrating an operation of an image forming device when importing one touch app data.

The operation of the image forming device 10B when importing the one touch app data will be described below with reference to the flowchart of FIG. 18.

In step S201, the image forming device 10B updates one touch app data registered in the image forming device 10B by using imported file data.

Then, in step S202, the controller 31 analyzes the updated one touch app data. By taking the state of the image forming device 10B into account, the controller 31 judges in step S203 whether the imported one touch apps include one touch apps that are not executable in the image forming device 10B.

If the imported one touch apps do not include any one touch apps that are not executable in the image forming device 10B (NO in step S203), the controller 31 completes the import processing.

If the imported one touch apps include one touch apps that are not executable in the image forming device 10B (YES in step S203), the controller 31 displays a list of inexecutable one touch apps on an operation panel 40B in step S204.

An example of a list of inexecutable one touch apps displayed on the operation panel 40B of the image forming device 10B is shown in FIG. 19.

FIG. 19 shows that two one touch apps called "XX (meeting material output)" and "Scan (for the general affairs department)" are not executable.

In step S205, a user checks this list and then takes certain measures for the inexecutable one touch apps. For example, the user deletes the inexecutable one touch apps, changes the set values and settings of the inexecutable one touch apps, or informs the user having authorization to make a change to the one touch apps that certain one touch apps are not executable.

In the example in FIG. 19, only the names of the inexecutable one touch apps are displayed. However, for each inexecutable one touch app, the reason why this one touch app is not executable or an inexecutable setting item of this one touch app may also be displayed.

For the inexecutable one touch apps, the user can take certain measures, such as deleting all the inexecutable one touch apps, changing the set values and settings of all the inexecutable one touch apps, informing the user having authorization to edit the one touch apps that these one touch apps are not executable. Alternatively, the user may delete an individual inexecutable one touch app, change set values and settings of an individual inexecutable one touch app, or inform the user having authorization to edit the one touch apps that an individual one touch app is not executable. The user may alternatively set the inexecutable one touch apps as checked apps without taking any measures.

Usually, a machine administrator executes cloning for copying one touch apps into another image forming device at one time. However, the machine administrator has the right to edit public data, but it does not have the right to edit private data. If a user having executed cloning does not have the right to edit an inexecutable one touch app, it may send information that this one touch app is not executable from the image forming device 10 to the creator of this one touch app by email, for example. Such information may be sent to the creator when the creator logs in the image forming device 10.

Alternatively, only when cloning of a one touch app is executed, may a user having no right to edit this one touch app specially be allowed to make a change to the one touch app, or may settings and set values of the one touch app automatically be changed so that the one touch app will be executable. In this case, the user may send information that a change has been made to the one touch app to the creator of this one touch app by email, for example, or such information may be sent to the creator when the creator logs in the image forming device 10 for the first time.

Figure 20:
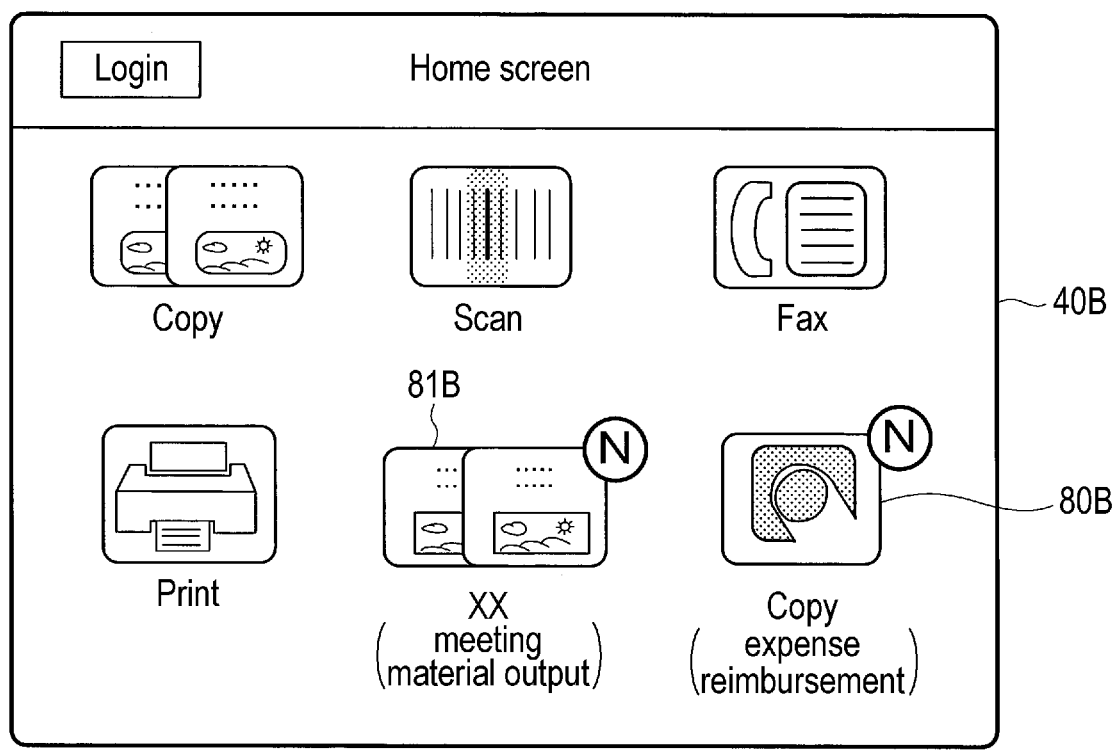
FIG. 20 illustrates one touch app icons displayed on the operation panel of the image forming device as a result of one touch apps being imported to the image forming device.

One touch app icons 80B and 81B displayed on the operation panel 40B as a result of one touch apps being imported to the image forming device 10B are shown in FIG. 20.

FIG. 20 shows that an N mark is added to the right corner of each of the one touch app icons 80B and 81B. The N mark indicates that the execution type of the one touch apps associated with the one touch app icons 80B and 81B is the immediate execution type and the one touch apps have not been created in the image forming device 10B but have been imported from another device and also that these one touch apps have not yet been checked by the image forming device 10B.

Figure 21:
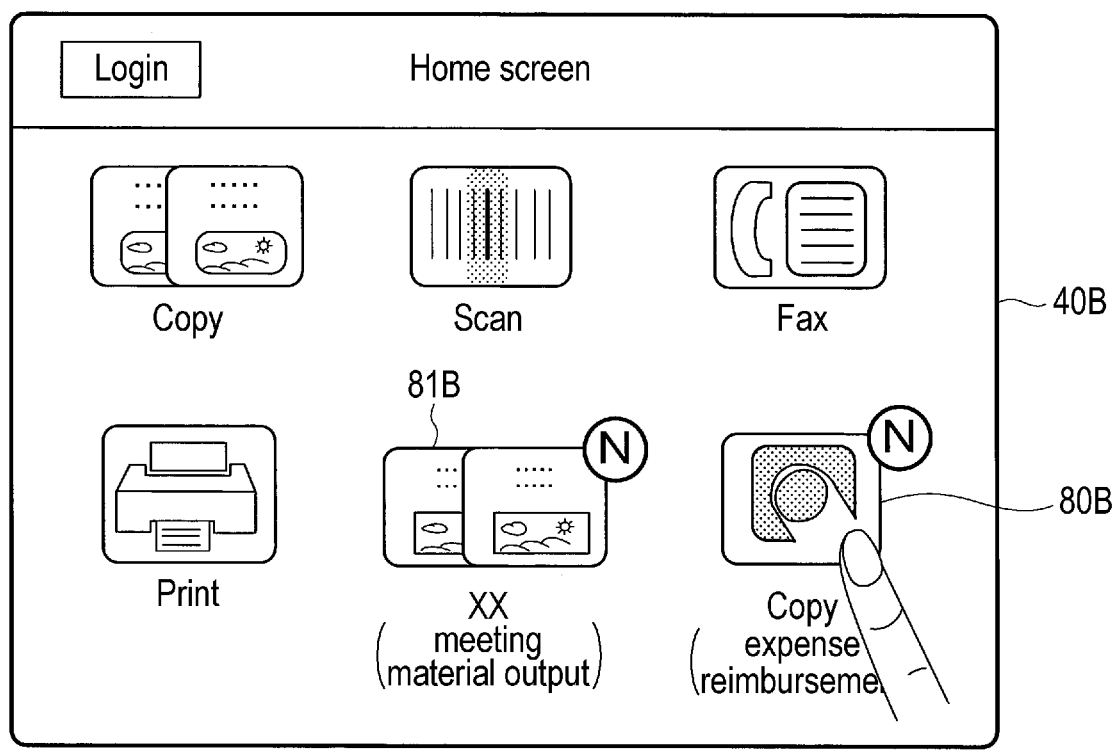
FIG. 21 illustrates a one touch app icon being tapped and selected after one touch apps have been imported to the image forming device.

The operation to be executed when the one touch app icon 80B has been tapped and selected as shown in FIG. 21 will be discussed below.

Figure 22:
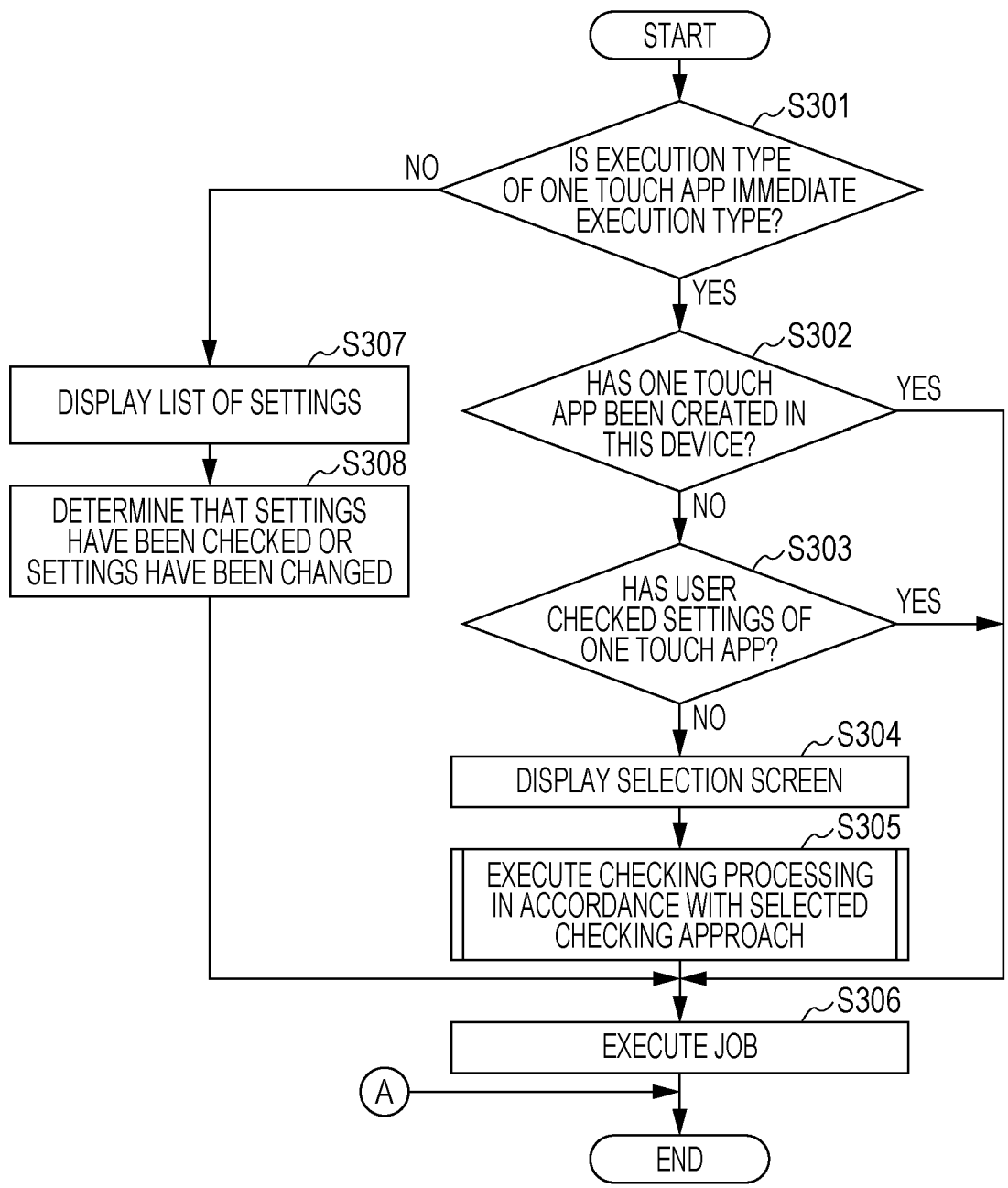
FIG. 22 illustrates an operation to be executed when a one touch app is selected.

A description will first be given below, with reference to the flowchart of FIG. 22, of the operation to be executed when a general one touch app is selected.

When a one touch app on the operation panel 40B is selected, the controller 31 judges in step S301 whether the execution type of the selected one touch app is the immediate execution type or the checked execution type.

Figure 23:
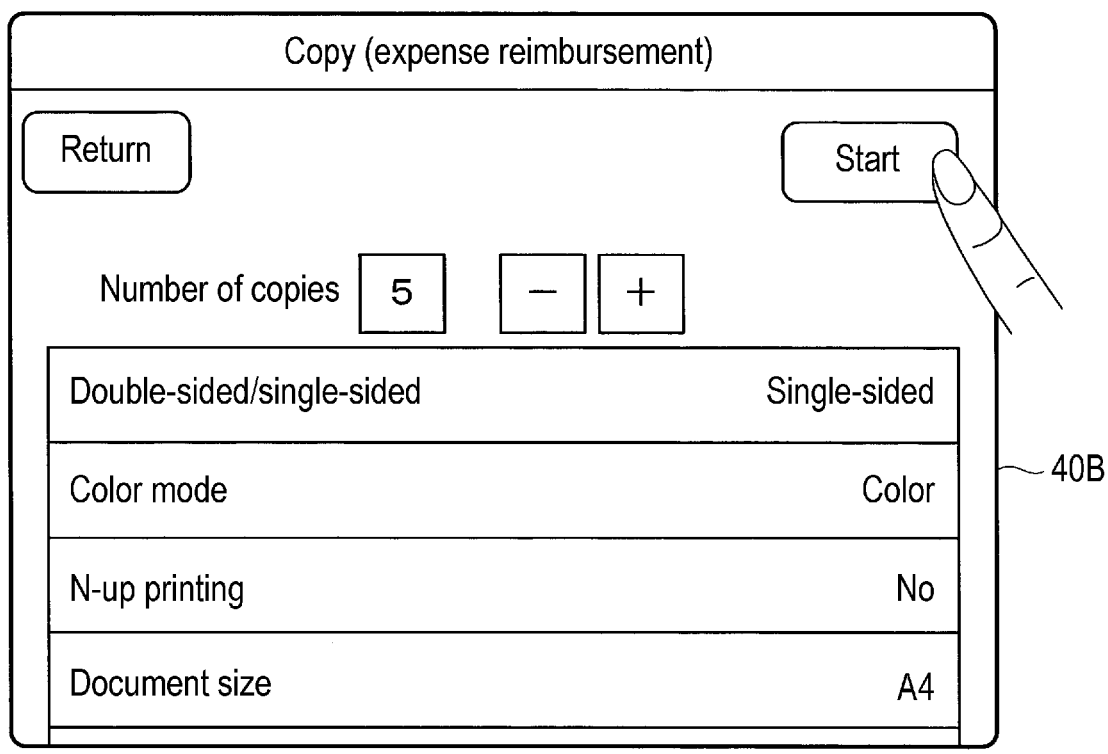
FIG. 23 illustrates an example of a display screen (check screen) indicating a list of settings of a one touch app.

If the execution type of the selected one touch app is not the immediate execution type, that is, it is the checked execution type (NO in step S301), the controller 31 proceeds to step S307. In step S307, the controller 31 displays a display screen (check screen) indicating a list of settings, such as that shown in FIG. 23. The execution type of the one touch app associated with the one touch app icon 80B shown in FIG. 21 is the immediate execution type, and thus, the check screen is not displayed. For the sake of description, however, a case in which the check screen is displayed is discussed here.

After checking the settings or changing the settings on the display screen, the user operates a start button. Then, in step S308, the controller 31 determines that the user has checked the settings or changed the settings. Then, in step S306, the controller 31 executes the job corresponding to the selected one touch app.

If the execution type of the selected one touch app is the immediate execution type (YES in step S301), the controller 31 judges in step S302 whether the one touch app has been created in the image forming device 10B. If the result of step S302 is NO, the controller 31 judges in step S303 whether the user has checked the settings of the one touch app.

If the one touch app has been created in the image forming device 10B (YES in step S302) or if the user has checked the settings of the one touch app (YES in step S303), the controller 31 proceeds to step S306 and executes the job corresponding to the one touch app without displaying the check screen for the user.

If the one touch app has not been created in the image forming device 10B (NO in step S302) and if the user has not checked the settings of the one touch app (NO in step S303), the controller 31 proceeds to step S304. In step S304, the controller 31 displays a selection screen on the operation panel 40B on which the user can select how to check the settings (checking approach) of the one touch app. An example of the selection screen is shown in FIG. 24.

In step S305, the controller 31 executes checking processing for checking the settings of the one touch app in accordance with the checking approach selected on the selection screen shown in FIG. 24, and then sets the one touch app as a checked app. Details of the checking processing will be discussed later. Then, in step S306, the controller 31 executes the job corresponding to the selected one touch app.

Figure 25:
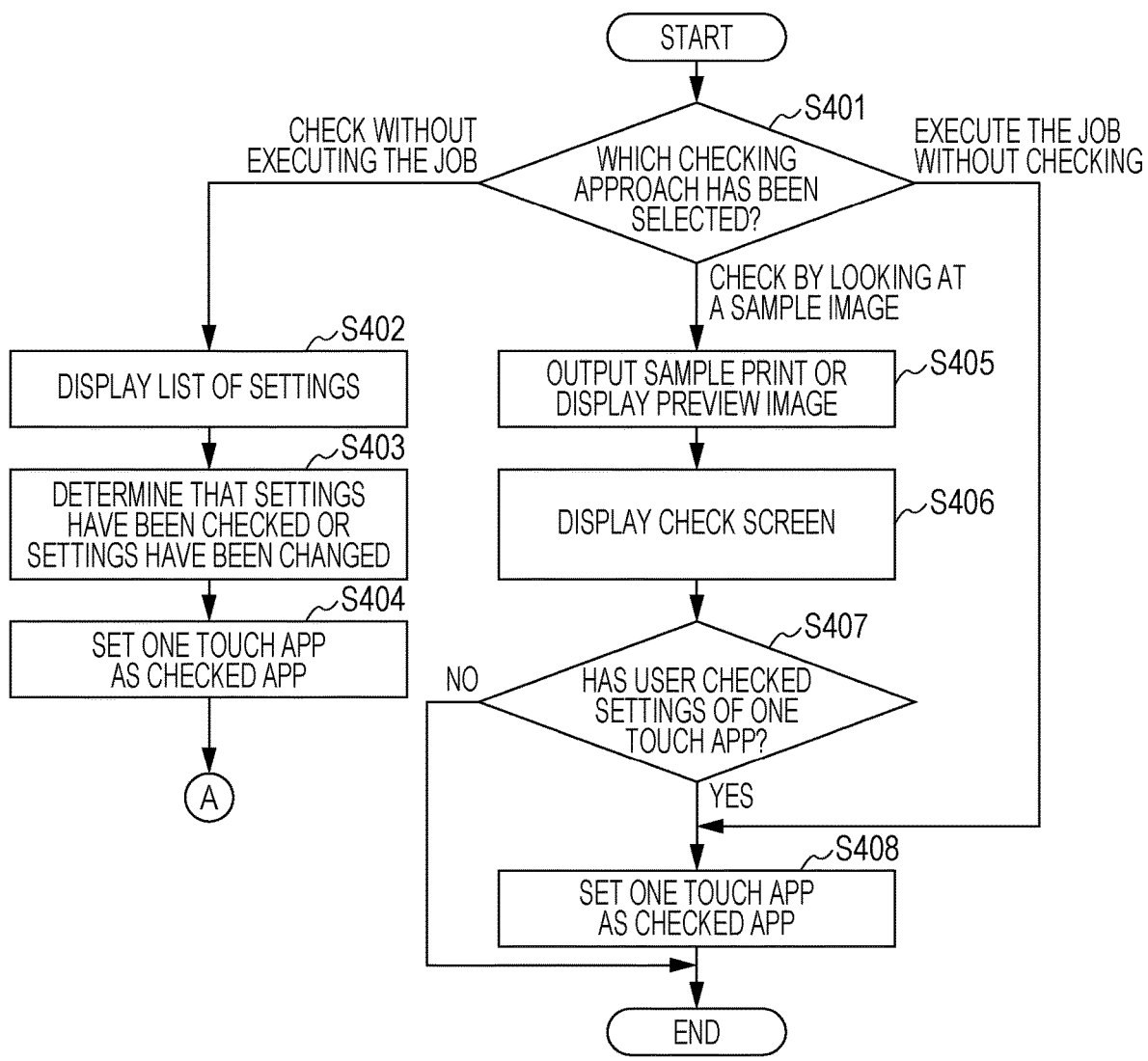
FIG. 25 is a flowchart illustrating details of checking processing discussed with reference to the flowchart of FIG. 22.

Details of the checking processing in step S305 discussed with reference to the flowchart of FIG. 22 will be described below with reference to the flowchart of FIG. 25.

In the example of the selection screen in FIG. 24, three checking approaches "Check without executing the job", "Check by looking at a sample image", and "Execute the job without checking" are shown.

In step S401, the controller 31 determines which one of the checking approaches the user has selected, and executes checking processing in accordance with the selected checking approach.

Figure 26:
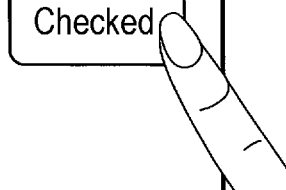
FIG. 26 illustrates an example of a display screen (check screen) showing a list of settings of a one touch app when the settings are checked without executing a job.

If the checking approach selected by the user is found to be "Check without executing the job" in step S401, the controller 31 proceeds to step S402. In step S402, the controller 31 displays a list of settings as a check screen, such as that shown in FIG. 26. In step S403, the user inputs information that it has checked the displayed settings or checked the settings by changing some settings. Then, in step S404, the controller 31 sets the one touch app as a checked app. In this case, the processing is terminated without executing the job in step S306 in the flowchart of FIG. 22.

Figure 27:
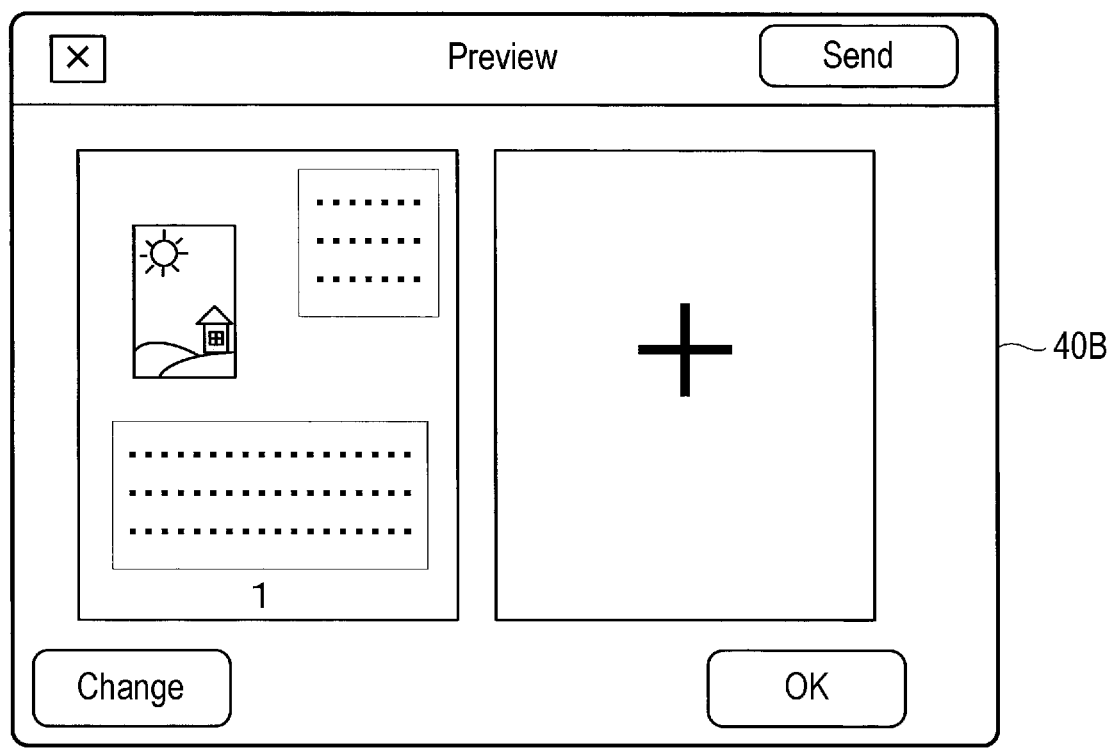
FIG. 27 illustrates an example of a preview image screen displayed on an operation panel.

If the checking approach selected by the user is found to be "Check by looking at a sample image" in step S401, the controller 31 proceeds to step S405. In step S405, if the selected one touch app concerns print processing, the controller 31 outputs a sample print from the image output unit 37. If the selected one touch app concerns scan processing, the controller 31 displays a document image read by the image reader 35 as a preview image. An example of a preview image screen is shown in FIG. 27.

Figure 28:
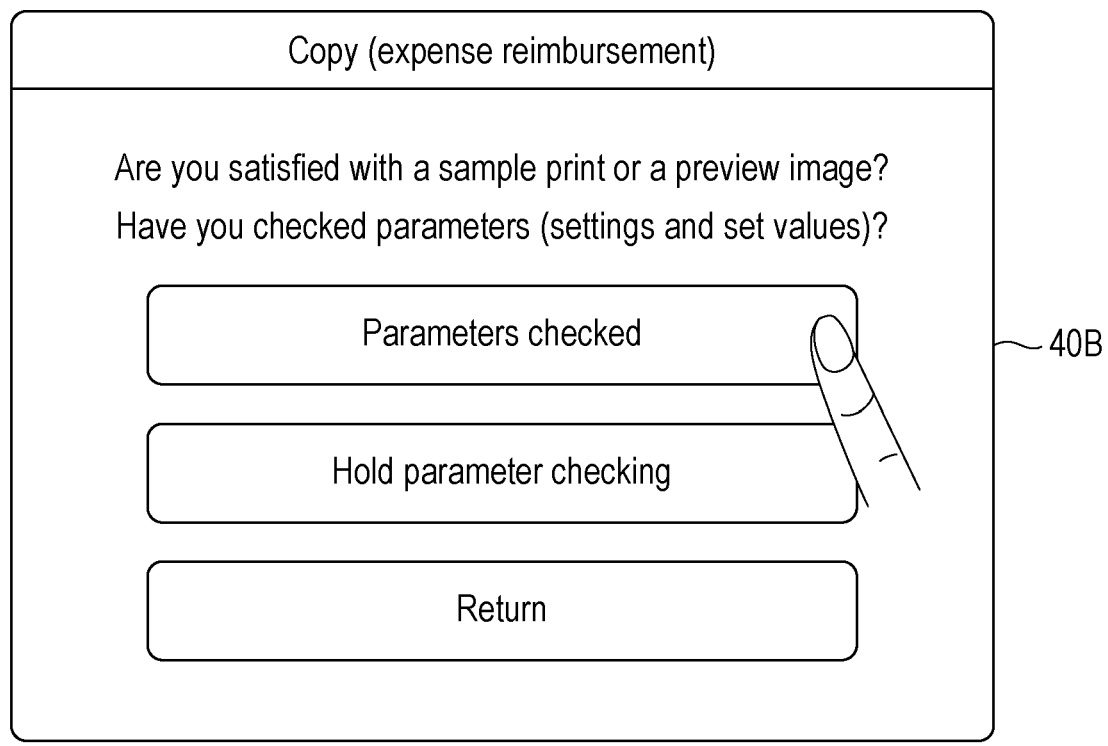
FIG. 28 illustrates an example of a parameter check screen displayed on the operation panel.

After outputting a sample print or displaying a preview image, in step S26, the controller 31 displays a parameter check screen on the operation panel 40B, such as that in FIG. 28.

If the user has judged, after looking at a sample print or a preview image, that the output result or the reading result is what the user has intended, the user touches a "Parameters checked" button on the parameter check screen.

The controller 31 then judges in step S407 that the user has checked the settings of the one touch app (YES in step S407). Then, in step S408, the controller 31 sets the one touch app as a checked app. If the user has touched a "Hold parameter checking" button, the controller 31 judges in step S407 that the user has not checked the settings of the one touch app (NO in step S407), and the controller 31 does not set the one touch app as a checked app.

If the checking approach selected by the user is found to be "Execute the job without checking" in step S401, in step S408, the controller 31 assumes that the one touch app has been checked without executing checking processing. In this case, the controller 31 sets the one touch app as a checked app and executes the job without the user checking the settings of the one touch app.

Figure 29:
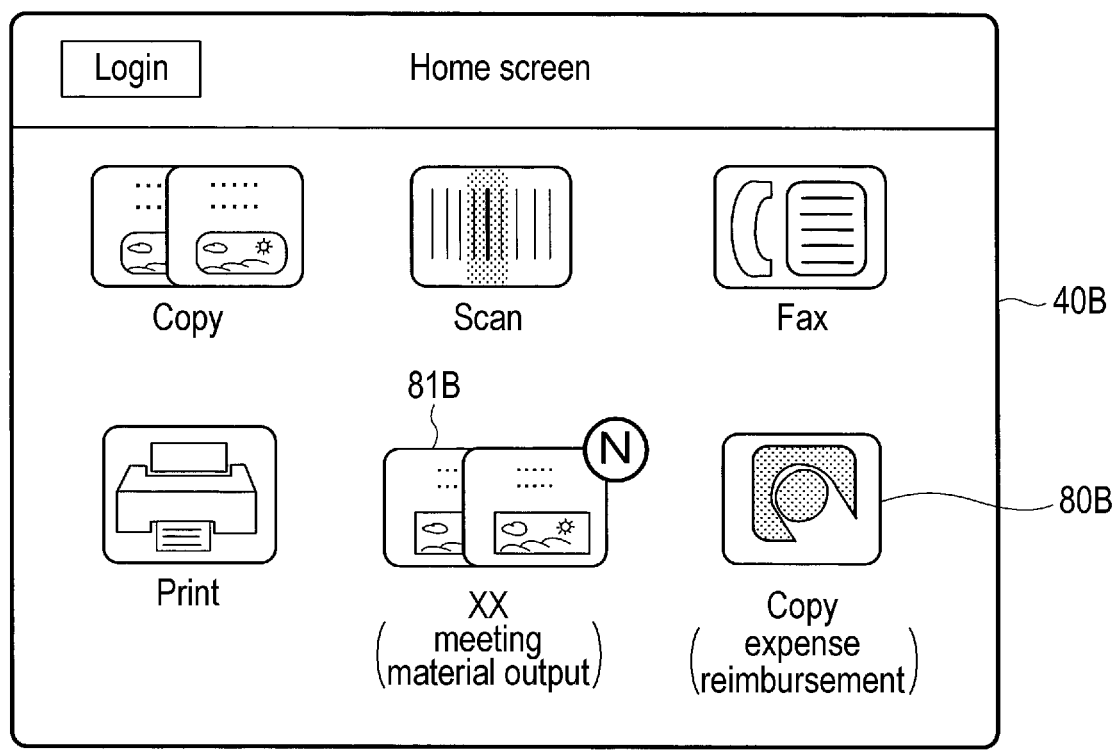
FIG. 29 illustrates an example of a home screen when a one touch app "Copy (expense reimbursement)" has been changed to a checked app.

A display example of the home screen when a one touch app called "Copy (expense reimbursement)" is changed to be a checked app as a result of executing the above-described checking processing is shown in FIG. 29. On the home screen in FIG. 29, the user can understand that the one touch app associated with the one touch app icon 80B "Copy (expense reimbursement)" has been checked because the N mark is erased from the one touch app icon 80B.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming device comprising:
    a processor configured to function as:
        a checking unit that checks whether processing execution data to be executed with a preset setting is selected, whether the processing execution data has not been created in the image forming device and whether the preset setting has not yet been checked for a user's intention,
            wherein, when the processing execution data is selected, the processing execution data has not been created in the image forming device and the preset setting has not yet been checked for the user's intention, the checking unit is further configured to determine whether a processing result is what the user has intended; and
        a registering unit that registers the processing execution data as checked data when the checking unit has determined that the processing result is what the user has intended, and does not register the processing execution data as the checked data when the checking unit has determined that the processing result is not what the user has intended.

2. The image forming device according to claim 1, wherein, when processing execution data is selected and executed for a first time after the processing execution data has been copied into the image forming device from another image forming device, if the processing execution data has successfully been executed, the checking unit checks that the processing result is what a user has intended.

3. The image forming device according to claim 2, wherein the processor is further configured to function as:
    a receiving unit that receives a change made to a setting of processing execution data to be checked when the checking unit is checking whether a processing result of the processing execution data is what a user has intended; and
    a changing unit that makes a change to the processing execution data in accordance with the change made to the setting received by the receiving unit.

4. The image forming device according to claim 1, wherein, if processing execution data to be checked concerns copying processing, the checking unit performs test printing and checks whether a printing result is what a user has intended, and if processing execution data to be checked concerns reading processing, the checking unit displays a read image and checks whether a display result is what a user has intended.

5. The image forming device according to claim 4, wherein, if the user has input information indicating that the user has checked the processing result, the checking unit checks that the processing result is what the user has intended.

6. The image forming device according to claim 5, wherein the processor is further configured to function as:
    a receiving unit that receives a change made to a setting of processing execution data to be checked when the checking unit is checking whether a processing result of the processing execution data is what a user has intended; and
    a changing unit that makes a change to the processing execution data in accordance with the change made to the setting received by the receiving unit.

7. The image forming device according to claim 4, wherein, if the user has provided an instruction to execute the processing execution data after test printing has been performed or the read image has been displayed, the checking unit checks that the processing result is what the user has intended.

8. The image forming device according to claim 7, wherein the processor is further configured to function as:
    a receiving unit that receives a change made to a setting of processing execution data to be checked when the checking unit is checking whether a processing result of the processing execution data is what a user has intended; and
    a changing unit that makes a change to the processing execution data in accordance with the change made to the setting received by the receiving unit.

9. The image forming device according to claim 4, wherein the processor is further configured to function as:
    a receiving unit that receives a change made to a setting of processing execution data to be checked when the checking unit is checking whether a processing result of the processing execution data is what a user has intended; and
    a changing unit that makes a change to the processing execution data in accordance with the change made to the setting received by the receiving unit.

10. The image forming device according to claim 1, wherein the processor is further configured to function as:
    a receiving unit that receives a change made to a setting of processing execution data to be checked when the checking unit is checking whether a processing result of the processing execution data is what a user has intended; and
    a changing unit that makes a change to the processing execution data in accordance with the change made to the setting received by the receiving unit.

11. The image forming device according to claim 10, wherein, if a user having made a change to the setting of the processing execution data does not have authorization to make a change to the processing execution data, the changing unit temporarily receives a change made to the setting received by the receiving unit and informs a preset address that a change is required to be made to the setting.

12. The image forming device according to claim 10, wherein, if a user having made a change to the setting of the processing execution data does not have authorization to make a change to the processing execution data, the changing unit generates new processing execution data in which a change made to the setting received by the receiving unit is reflected.

13. A non-transitory computer readable medium storing a program causing a computer to execute a process, the process comprising:
    checking whether processing execution data to be executed with a preset setting is selected, whether the processing execution data has not been created in an image forming device and whether the preset setting has not yet been checked for a user's intention, wherein when the processing execution data is selected, the processing execution data has not been created in the image forming device and the preset setting has not yet been checked for the user's intention, the checking further determining whether a processing result is what the user has intended; and registering the processing execution data as checked data when it is determined that the processing result is what the user has intended and does not register the processing execution data as the checked data when it is determined that the processing result is not what the user has intended.

14. An image forming device comprising:

a processor configured to function as:

a checking unit that checks, when processing execution data to be executed with a preset setting is selected, whether a processing result is what a user has intended if the processing execution data has not been created in the image forming device and if the preset setting has not yet been checked; and a registering unit that registers the processing execution data as checked data if the checking unit has checked that the processing result is what the user has intended, wherein, when processing execution data is selected and executed for a first time after the processing execution data has been copied into the image forming device from another image forming device, if the processing execution data has successfully been executed, the checking unit checks that the processing result is what a user has intended.

* * * * *